United States Patent
Kim et al.

(10) Patent No.: US 10,457,822 B2
(45) Date of Patent: Oct. 29, 2019

(54) INK COMPOSITION FOR MARKING RELEASE-TREATED SURFACE, AND PROTECTIVE FILM CONTAINING SAME

(71) Applicant: LG CHEM, LTD., Seoul (KR)

(72) Inventors: Joon-Hyung Kim, Daejeon (KR); Kook-Hyun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 250 days.

(21) Appl. No.: 15/315,691

(22) PCT Filed: May 29, 2015

(86) PCT No.: PCT/KR2015/005396
§ 371 (c)(1),
(2) Date: Dec. 1, 2016

(87) PCT Pub. No.: WO2015/186926
PCT Pub. Date: Dec. 10, 2015

(65) Prior Publication Data
US 2017/0198159 A1    Jul. 13, 2017

(30) Foreign Application Priority Data

Jun. 3, 2014 (KR) .......................... 10-2014-0067442
May 28, 2015 (KR) .......................... 10-2015-0074618

(51) Int. Cl.
*C09D 11/107* (2014.01)
*C09D 11/033* (2014.01)
*C09D 11/037* (2014.01)

(52) U.S. Cl.
CPC .......... *C09D 11/107* (2013.01); *C09D 11/033* (2013.01); *C09D 11/037* (2013.01)

(58) Field of Classification Search
CPC ........................... C09D 11/107; C09D 11/033
USPC ................................................. 523/160, 151
See application file for complete search history.

(56) References Cited

U.S. PATENT DOCUMENTS

| | | | |
|---|---|---|---|
| 4,446,259 A | 5/1984 | Vasta | |
| 4,740,549 A * | 4/1988 | Okuzono | C09D 11/16 106/31.32 |
| 4,996,093 A * | 2/1991 | Koshizuka | B41M 5/38228 428/32.75 |
| 5,075,170 A * | 12/1991 | Matsushita | B41M 5/395 428/32.86 |
| 7,709,417 B2 | 5/2010 | Yukawa | |
| 7,754,784 B2 | 7/2010 | Sugita et al. | |
| 2003/0054286 A1* | 3/2003 | Sato | G03F 7/0045 430/270.1 |
| 2003/0171453 A1* | 9/2003 | Li | C09D 11/16 523/160 |
| 2006/0262174 A1* | 11/2006 | Aoai | B41C 1/1066 347/100 |

FOREIGN PATENT DOCUMENTS

| | | |
|---|---|---|
| CN | 1867957 | 11/2006 |
| CN | 101074334 | 11/2007 |
| JP | 02-136293 * | 5/1990 |
| JP | H02136293 | 5/1990 |
| JP | 1995026188 A | 1/1995 |
| JP | 2752395 B2 | 5/1998 |
| JP | 2004025569 | 1/2004 |
| KR | 100217860 B1 | 9/1999 |
| KR | 101209676 B1 | 12/2012 |
| KR | 101388972 B1 | 4/2014 |
| WO | 2013015378 A1 | 1/2013 |

OTHER PUBLICATIONS

Machine translation of JP 02-136293 (Year: 1990).*
Dorsey et al, Determination of the Epoxide Equivalent Weight of Glycidyl Ethers, Analytical Chemistry, vol. 49, No. 8, Jul. 1977 (Year: 1997).*
Yukun, Y. (Ed.) and L. Ting (Ed.), "Handbook of Pressure Sensitive Adhesive Products and Technology," Pressure Sensitive Adhesives Technical Manual, pp. 570-572.
Yao et al., Dictionary of Chemistry, Student Book Series; (1996); English Language Translation provided; 4 pages.

* cited by examiner

*Primary Examiner* — Doris L Lee
(74) *Attorney, Agent, or Firm* — Dentons US LLP

(57) ABSTRACT

Disclosed herein is an ink composition for marking on a release-treated surface, comprising a binder resin based on an acryl or methacryl resin with a glycidyl group introduced as a functional group thereinto, a dye, and an organic solvent, wherein the binder resin has a glass transition temperature of 40° C. or higher.

19 Claims, No Drawings

INK COMPOSITION FOR MARKING RELEASE-TREATED SURFACE, AND PROTECTIVE FILM CONTAINING SAME

CROSS REFERENCE TO RELATED APPLICATION

This application is a National Stage Application of International Application No. PCT/KR2015/005396, filed May 29, 2015, and claims the benefit of Korean Patent Application No. 10-2015-0074618, filed May 28, 2015 and Korean Patent Application No. 10-2014-0067442, filed Jun. 3, 2014, the contents of which are incorporated herein by reference in their entirety for all purposes as if fully set forth below.

BACKGROUND OF THE INVENTION

1. Technical Field

The present invention relates to an ink composition for marking on a release-treated surface. More particularly, the present invention relates to an ink composition for marking on a release-treated surface, comprising a binder resin with a glycidyl group introduced as a functional group thereinto.

2. Description of the Related Art

Protective films are widely used to protect base films from mechanical damage or contamination during production, storage, and distribution.

For release-treated, a protective film is usually coated with a silicon-based material that is low in surface energy. The release-treated aims to prevent the contamination of the protective film with external contamination sources as well as to readily release the protective film.

Due to its low surface energy, however, the release-treated film is difficult to coat with other materials. This is intended by the design of release-treated, but has the disadvantage that it is difficult to print or mark on the release-treated film. That is, a film with low surface energy does not permit ink to be printed or marked thereon because of its water or oil repellency. If printed on the film, ink is highly apt to be released, which may produce secondary contamination on a substance in contact with the surface of the film.

To solve this problem, Japanese Unexamined Patent Application Publication No. 1995-026188 discloses an ink composition comprising a water-soluble binder resin containing a glycidyl group, water, and a water-miscible solvent. To be dissolved in a water-miscible solvent, however, the binder should be given a specific acid value. In addition, it takes more time to dry a water-miscible solvent than an organic solvent.

There is therefore a need for an ink composition for marking on a release-treated surface that can overcome the problems encountered in the art.

RELATED ART DOCUMENT

Patent Document (Patent Document 1) JP 1995-026188 A

SUMMARY OF THE INVENTION

Accordingly, the present invention has been made keeping in mind the above problems occurring in the related art, and an object of the present invention is to provide an ink composition for marking on a release-treated surface that is not only imparted with reinforced adherence to the release-treated protective film upon marking, but also is so improved in transferability such that it is neither tacky after drying nor does it contaminate objects in contact therewith.

The present invention provides an ink composition for marking on a release-treated surface, comprising a binder resin based on an acryl or methacryl resin grafted with a glycidyl group as a functional group, a dye, and an organic solvent, wherein the binder resin has a glass transition temperature of 40° C. or higher.

Also, the present invention provides a protective film coated with the ink composition.

DESCRIPTION OF THE PREFERRED EMBODIMENTS

Below, a detailed description will be given of the present invention.

In accordance with an aspect thereof, the present invention provides an ink composition for marking on a release-treated surface The ink composition for marking on a release-treated surface in accordance with the present invention comprises a binder resin based on an acryl or methacryl resin with a glycidyl group introduced as a functional group thereinto, a dye, and an organic solvent, wherein the binder resin has a glass transition temperature of 40° C. or higher.

The ink composition for marking on a release-treated surface in accordance with the present invention includes an acryl or methacryl resin with a functional glycidyl group introduced thereinto, as a binder resin. Based on an acryl or methacryl resin, the ink composition for marking on a release-treated surface in accordance with the present invention exhibits high adhesiveness to the substrate.

So long as it is an acryl or methacryl resin having glycidyl as a functional group, any binder resin can be used in the present invention without limitations thereto. Preferable is at least one of copolymers of acrylic acid or methacrylic acid and 2-hydroxy methyl acrylic acid. More preferably, a glycidyl methacrylate copolymer may be used. Examples of the acryl or methacryl resin containing a glycidyl group useful in the present invention include, but are not limited to, those commercially available from Reichhold, such as FINE-CLAD® A-253, A-254, A-257, and A-270, and those commercially available from Anderson Development, such as Almatex® PD-7610, PD-6300, PD-4219, PD-9200, PD-1700, Ap-4411, Ap-4418, and PD-3402. The binder resin is contained in an amount of from 2 to 10%, preferably 3 to 8%, more preferably 4 to 6% by weight, based on the total weight of the ink composition. When the content of the binder resin is below 2% by weight, almost no effects are obtained from the addition of the binder resin. On the other hand, a content of the binder resin exceeding 10% by weight gives the ink composition too high of a viscosity to perform further processes.

The content of glycidyl in the binder resin preferably ranges from 400 to 600 g/eq as converted into epoxy equivalent weight. If the glycidyl content is below an epoxy equivalent weight of 400 g/eq, the binder resin is poor in attachment strength to a substrate. On the other hand, a glycidyl content exceeding 600 g/eq is economically disadvantageous.

The binder resin according to the present invention preferably has a glass transition temperature (Tg) of 40° C. or higher, more preferably 40~100° C., and far more preferably 40~60° C. If the glass transition temperature of the binder resin meets the range, the ink composition that has been printed on a film and dried is not tacky so that the marks printed on the film are not transferred to a film that is pressed thereagainst. Further, the marks are not cut nor cracked, but adhere well to the printed film even when the printed film is bent.

The ink composition for marking on a release-treated surface in accordance with the present invention comprises a dye. The dye used in the ink composition for making on a release-treated surface in accordance with the present invention is intended for the visibility of printed marks. So long as it is dissolved in the organic solvent used in the present invention, any of the dyes generally listed in the Color Index may be employed in the present invention. Inter alia, solvent dyes are very useful. Examples of the dyes include Solvent black 27, Solvent black 28, Solvent black 29, Solvent black 34, Solvent yellow 21, Solvent orange 45, Solvent orange 62, solvent Red 122, Solvent red 8, Solvent red 160, Solvent red 218, and Solvent blue 70, but are not limited thereto. Alternatively, Orasol from BASF, or Fantha from Doill Color Chem may be used. The dye is contained in an amount of from 0.01 to 3%, preferably 0.05 to 1% by weight, based on the total weight of the ink composition. When the content of the dye is below 0.01% by weight, the visibility of the ink is not sufficient. On the other hand, a content of the dye exceeding 3% by weight gives the ink composition has bad effect in processes.

The ink composition for marking on a release-treated surface in accordance with the present invention comprises a solvent. The solvent useful in the ink composition for marking on a release-treated surface in accordance with the present invention is one that can be dried by heat, endowing the ink composition with a suitable viscosity. For use in the ink composition of the present invention, the solvent is thermally removable. In full consideration of dryness rate, the solvent may be selected from the group consisting of, but not limited to, acetone, methylethyl ketone, methylisobutyl ketone, cyclohexanone, methylbutyl ketone, ethanol, propanol, isopropanol, toluene, xylene, monomethyl amine, monoethyl amine, monoethanol amine, dimethylaminoethanol, dimethylethanol amine, diethanol amine, butyrolactone, propylacetate, ethyl propionate, butyl acetate, ethyl lactate, ethylethoxy propionate, 2-ethoxyethyl acetate, ethyl acetate, ethylether acetate, propyleneglycol methylether acetate, methoxy propanol, dibutyl ether, methoxybenzene, ethyleneglycol butylether, and a combination thereof. The content of the solvent in the ink composition of the present invention accounts for the rest except the binder resin and the dye.

Optionally, the ink composition of the present invention may comprise an additive, such as a polymerization inhibitor or a surfactant.

In the ink composition of the present invention, the polymerization inhibitor may be used to prevent a curing reaction during the storage of the ink composition even at room temperature. No particular limitations are imparted to the use of a polymerization inhibitor in the present invention so long as it is typical in the art.

Given, a surfactant may function to control the surface tension of the ink composition such that the ink composition can be smoothly sprayed and properly spread over a substrate. So long as it is typically used in the art, any surfactant may be contained in the ink composition without limitations thereto.

When account is taken of economical aspect, the additive may be used in a minimum amount that can guarantee its intrinsic performance Preferably, the additive may be contained in an amount of 0.1~5% by weight, based on the total weight of the ink composition.

As the ink composition for marking on a release-treated surface in accordance with the present invention has the composition as described above, even if the release-treated surface, for example, the protective film is marked, the adhesion to the protective film is enhanced. Furthermore after drying, the ink composition is not sticky. Therefore, so as not to contaminate other objects contact with, the ink transfer properties are improved.

In accordance with another aspect thereof, the present invention provides a protective film coated with the ink composition of the present invention.

So long as it functions to protect base films from mechanical damage or contamination, any protective film may be used in the present invention without particular limitation.

A better understanding of the present invention may be obtained through the following example(s) which is (are) set forth to illustrate, but is (are) not to be construed as the limit of the present invention.

EXAMPLES

1. Preparation of Ink Composition

Ink compositions were prepared as described for Examples 1 to 4 and Comparative Examples 1 to 3 in Table 1.

TABLE 1

|  | Binder | | | Dye | Organic Solvent |
|---|---|---|---|---|---|
|  | Component | Tg (° C.) | Epoxy equivalent (g/eq) | | |
| Ex. 1 | A-1; 5 wt % | 55~58 | 510~560 | B-1; 0.1 wt % | C-1; 94.9 wt % |
| Ex. 2 | A-1; 5 wt % | 55~58 | 510~560 | B-1; 0.2 wt % | C-2; 94.8 wt % |
| Ex. 3 | A-2; 5 wt % | 42~46 | 510~560 | B-1; 0.1 wt % | C-2; 94.9 wt % |
| Ex. 4 | A-2; 5 wt % | 42~46 | 510~560 | B-2; 0.1 wt % | C-2; 94.9 wt % |
| C. Ex. 1 | A-3; 7 wt % | Unknown | 0 | B-3; 3.0 wt % | C-2; 90.0 wt % |
| C. Ex. 2 | A-4; 5 wt % | 55~57 | 0 | B-1; 0.1 wt % | C-2; 94.9 wt % |
| C. Ex. 3 | A-5; 5 wt % | 10~15 | 0 | B-1; 0.1 wt % | C-2; 94.9 wt % |

A-1: Anderson Development PD-6300
A-2: Anderson Development PD-7610
A-3: Hercules Company R520
A-4: Hydroxybutyl acryl resin-acryl resin copolymer (in-house prepared)
A-5: Acryl resin (LG MMA)
B-1: Orasol Blue 855
B-2: Orasol Red 395
B-3: Solvent Blue 5
C-1: Acetone
C-2: Methylethylketone

Test Examples

The ink compositions prepared in Examples 1 to 4 and Comparative Examples 1 to 3 were assayed for printability, adhesiveness, and transferability as follows.

Test Example 1: Printability

For the evaluation of printability, the ink compositions were printed on a protective film and observed to see whether the printed patterns were maintained without dewetting.

Results are given in Table 2. The printability of the ink compositions was determined to be good in the absence of dewetting, and to be poor in the presence of dewetting to cause deformation of the original pattern before the ink was dried.

Test Example 2: Adhesiveness

The ink compositions were evaluated for adhesiveness. In this regard, the ink compositions were printed to form patterns on a protective film, and dried. A film was pressed and rubbed against the patterns on the protective film by hand to examine whether the patterns peeled off. The results are given in Table 2. For adhesiveness, the ink compositions were determined to be good when the patterns retained their original states, and poor when a part of the patterns peeled off.

Test Example 3: Transferability

The ink compositions were evaluated for transferability. To this end, first, the ink compositions were printed to form patterns on a protective film, and dried. Then, a film was pressed against the patterns on the protective film to examine whether the patterns were transferred to the pressing film. A trace of ink on the pressing film was monitored with the naked eye. The results are given in Table 2.

TABLE 2

|  | Printability | Adhesiveness | Transferability | Note |
| --- | --- | --- | --- | --- |
| Example 1 | Good | Good | No trace | Suitable |
| Example 2 | Good | Good | No trace | Suitable |
| Example 3 | Good | Good | No trace | Suitable |
| Example 4 | Good | Good | No trace | Suitable |
| C. Example 1 | Poor | Poor | Transferred | Unsuitable |
| C. Example 2 | Poor | Poor | No trace | Unsuitable |
| C. Example 3 | Poor | Poor | Transferred | Unsuitable |

As is understood from the data of Table 2, the ink compositions of Examples 1 to 4 are superior in terms of all of printability, adhesiveness, and transferability. In contrast, the ink compositions of Comparative Examples 1 and 3 are poor in all of printability, adhesiveness, and transferability. Although good in transferability, the ink composition of Comparative Example 2, which does not contain a glycidyl group, showed poor printability and adhesiveness. Hence, the ink compositions of the Comparative Examples are unsuitable for use in marking on a release-treated surface.

As described above, in the ink composition for marking on a release-treated surface in accordance with the present invention, the binder resin is well dissolved in an organic solvent irrespective of its acid value, and the organic solvent can be quickly dried so that the solvent can be readily removed to prevent the transfer of the ink pattern printed. In addition, after being dried at room temperature, the printed patterns of the ink composition on a release-treated surface are not tacky and are unlikely to be transferred to a film that is pressed against the patterns. Moreover, even when the release-treated surface is bent, the patterns of the ink composition printed on the release-treated surface are not cracked nor peeled off, but adhere well to the film.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ink composition for marking on a release-treated surface, comprising:
   a binder resin based on an acryl or methacryl resin with a glycidyl group introduced as a functional group thereinto;
   a dye; and
   an organic solvent,
   wherein the binder resin;
      has a glass transition temperature of 40° C. or higher and has a glycidyl content of 400-600 g/eq as converted into epoxy equivalent weight; and
      is present in an amount of 2-10% by weight, based on a total weight of the ink composition.

2. The ink composition of claim 1, wherein the binder resin has a glass transition temperature of 40 to 100° C.

3. The ink composition of claim 1, wherein the binder resin has a glass transition temperature of 40 to 60° C.

4. The ink composition of claim 1, wherein the ink composition contains the binder resin in an amount of 4-6% by weight based on the total weight of the ink composition.

5. The ink composition of claim 1, wherein the ink composition contains the dye in an amount of 0.01-3% by weight, based on a total weight thereof.

6. The ink composition of claim 1, wherein the ink composition contains the dye in an amount of 0.05-1% by weight, based on a total weight thereof.

7. The ink composition of claim 1, wherein the organic solvent is selected from the group consisting of acetone, methyl ethyl ketone, methyl isobutyl ketone, cyclohexanone, methyl butyl ketone, ethanol, propanol, isopropanol, toluene, xylene, monomethylamine, monoethylamine, monoethanolamine, dimethylaminoethanol, dimethylethanolamine, diethanolamine, butyrolactone, propyl acetate, ethyl propionate, butyl acetate, ethyl lactate, ethyl ethoxy propionate, 2-ethoxyethyl acetate, ethyl acetate, ethyl ether acetate, propylene glycol methyl ether acetate, methoxy propanol, dibutyl ether, methoxybenzene, ethylene glycol butyl ether, and a combination thereof.

8. The ink composition of claim 1, further comprising an additive.

9. The ink composition of claim 8, wherein the additive is a polymerization inhibitor.

10. The ink composition of claim 8, wherein the additive is a surfactant.

11. The ink composition of claim 8, wherein the ink composition contains the additive in an amount of 0.1-5% by weight, based on a total weight thereof.

12. The ink composition of claim 1, wherein the ink composition is used for a protective film.

13. A protective film, coated with the ink composition of claim 1.

14. An ink composition for marking on a release-treated surface, comprising:

a binder resin based on an acryl or methacryl resin with a glycidyl group introduced as a functional group thereinto;

a dye; and an organic solvent, wherein the binder resin:

has a glass transition temperature of 40° C. or higher and has a glycidyl content of 400-600 g/eq as converted into epoxy equivalent weight; and is present in an amount of 3-8% by weight based on a total weight of the ink composition.

15. The ink composition of claim 14, wherein the ink composition contains the dye in an amount of 0.05-1% by weight based on the total weight of the ink composition.

16. The ink composition of claim 14, wherein the organic solvent is selected from the group consisting of acetone, methyl ethyl ketone, methyl isobutyl ketone, cyclohexanone, methyl butyl ketone, ethanol, propanol, isopropanol, toluene, xylene, monomethylamine, monoethylamine, monoethanolamine, dimethylaminoethanol, dimethylethanolamine, diethanolamine, butyrolactone, propyl acetate, ethyl propionate, butyl acetate, ethyl lactate, ethyl ethoxy propionate, 2-ethoxyethyl acetate, ethyl acetate, ethyl ether acetate, propylene glycol methyl ether acetate, methoxy propanol, dibutyl ether, methoxybenzene, ethylene glycol butyl ether, and a combination thereof.

17. The ink composition of claim 14, further comprising an additive that is a polymerization inhibitor or is a surfactant, wherein the additive is present in an amount of 0.1-5% by weight based on the total weight of the ink composition.

18. The ink composition of claim 14, wherein the ink composition is used for a protective film.

19. A protective film, coated with the ink composition of claim 14.

* * * * *